United States Patent [19]
Nicholson

[11] 3,817,540
[45] June 18, 1974

[54] WASHERS AND GASKETS

[76] Inventor: Terence Peter Nicholson, Calf Hall, Muggleswick, County Durham, England

[22] Filed: Apr. 17, 1972

[21] Appl. No.: 244,600

[30] Foreign Application Priority Data
Apr. 27, 1971 Great Britain.................. 11594/71

[52] U.S. Cl................................ 277/236, 277/180
[51] Int. Cl............................................. F16j 15/08
[58] Field of Search......... 277/235 B, 236, 213, 180

[56] References Cited
UNITED STATES PATENTS
| | | | |
|---|---|---|---|
| 1,928,116 | 9/1933 | Stephens | 277/235 B |
| 2,397,597 | 4/1946 | Dunkle | 277/213 |
| 2,695,186 | 11/1954 | Balfe | 277/235 B |
| 3,578,346 | 5/1971 | Jelinek | 277/180 |

FOREIGN PATENTS OR APPLICATIONS
1,057,861    2/1967    Great Britain.................. 277/235 B Primary Examiner—Louis R. Prince
Assistant Examiner—Robert I. Smith
Attorney, Agent, or Firm—Jones and Lockwood

[57] ABSTRACT

A washer or gasket consisting of two apertured layers of metal secured to one another, the upper layer being provided with one or more corrugations surrounding the or each aperture whereby the clamping load on a washer or gasket located between two mating surfaces is concentrated on said corrugations which seal their associated apertures. The lower layer is secured to the upper layer in such a manner as to assist the corrugations in their resistance to being flattened by the clamping load.

8 Claims, 5 Drawing Figures

PATENTED JUN 18 1974　　　　　　　　　　　　　　　　3,817,540

WASHERS AND GASKETS

This invention relates to washers and gaskets, and more particularly to corrugated washers and gaskets adapted to be located between, to seal, a pair of mating surfaces provided with apertures through which fluid is flowing.

It will be appreciated that the meanings of the expressions "washer" and "gasket" overlap to some extent, the word "washer" usually being used to describe a comparatively narrow annulus round an opening, whilst the word "gasket" is used where there is more of the gasket material round the opening and particularly where the object has more than one opening to be sealed. In the attached claims, the generic term "sealing means" has been used to cover both "washers" and "gaskets."

The basic theory of the corrugated washer or gasket is to emboss a corrugation in the washer or gasket, to surround the aperture to be sealed. This results in the total clamp load on the washer or gasket being concentrated into a very small area instead of being dissipated over the whole of the mating surface.

FIGS. 1 and 2 of the accompanying drawings show a section through a known type of metal washer having a single corrugation, and a plan view of part of a known type of metal gasket having an oval aperture, respectively. Referring to these figures, the washer 9 of FIG. 1 provides a single corrugation round an opening 10, the corrugation 12 being circular and lying between two plain bands or hoops 14, 16.

As the washer is clamped between two surfaces, e.g., pipe flanges, above and below the washer, the compression of the corrugation by the clamping force is resisted by the hoops 14, 16 and good contact is made with the sealing surfaces at the top of the corrugation and along the circles where the corrugation joins the hoops 14, 16.

The danger in the use of this type of washer is that the pressure applied to form the seal will be sufficient to flatten the corrugation, thus losing any benefit from the construction.

The flattening of the corrugation can be resisted to some extent, particularly in the case of multi-aperture gaskets, by the use of support corrugations, i.e., corrugations further from the apertures than those surrounding the apertures.

A particular difficulty arises in the case of non-circular apertures. FIG. 2 shows part of a gasket 11 having an aperture 10 with straight sides and semi-circular ends, the corrugation 12 being similarly shaped. Here the effect of the clamping is different from the circular corrugation of FIG. 1. Round the semi-circular ends, i.e., between A — A and B — B, there is the strength of the material plus the hoop strength to resist compression from the clamping force, whereas along the straight sides A - B there is only the material strength, and consequently, however carefully the clamping pressure is limited to its optimum value, the contact pressure between the gasket and the sealing surfaces is very much less along the straight sides A - B than at the circular ends of the corrugation. The result of this is that a leak path is easily established along the straight sides.

Thus there are obvious disadvantages to known arrangements.

According to the present invention, there is provided a washer or gasket comprising two correspondingly apertured layers of material, the first of said layers being provided with at least one upstanding corrugation surrounding the or each aperture, and the second layer being secured to the first layer at or adjacent the or each aperture.

In the case of a washer, the second layer may be further secured to the first layer over a region remote from the aperture therethrough, a preferred form of washer being such that the first layer is provided with one upstanding corrugation surrounding the aperture and the second layer is of annular form and is secured to the first layer round the inner and outer peripheries thereof.

When a gasket is being constructed to seal a number of apertures, for example a cylinder head gasket of an automobile engine, the first and second layers may be secured together by bending of the material of the second layer round the defining edge of the or each aperture in the first layer, the thickness of the material of the second layer being less than the height of the or each corrugation.

By way of example only, embodiments of the invention will now be described in greater detail with reference to FIGS. 3 to 5 of the accompanying drawings of which:

Figure 1:
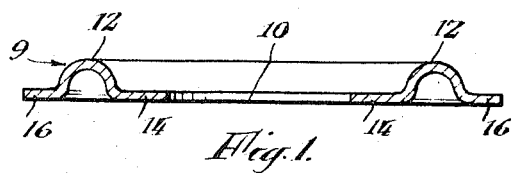
Figure 3:
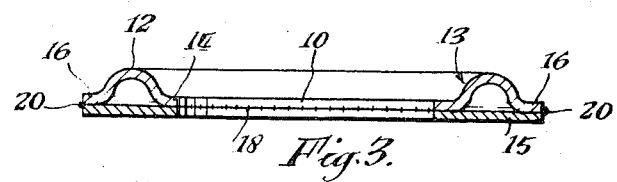
FIG. 3 is a section through one form of washer according to the present invention.

Referring to the drawings, FIG. 3 illustrates a metal washer where the width of the annulus formed by the washer has been reduced, as is often necessary, as compared with the washer of FIG. 1. The upper part 13 of the washer is very similar to that shown in FIG. 1 and it includes a circular corrugation 12, and plain bands 14,16 which have been greatly reduced in size as compared with FIG. 1. Below this upper part 13 has been located a second layer consisting of a plane annulus 15 which has been welded or brazed to the upper part 13 round the inner and outer peripheries, as shown at 18 and 20. If necessary the plain bands 14,16 may be omitted altogether.

Figure 2:
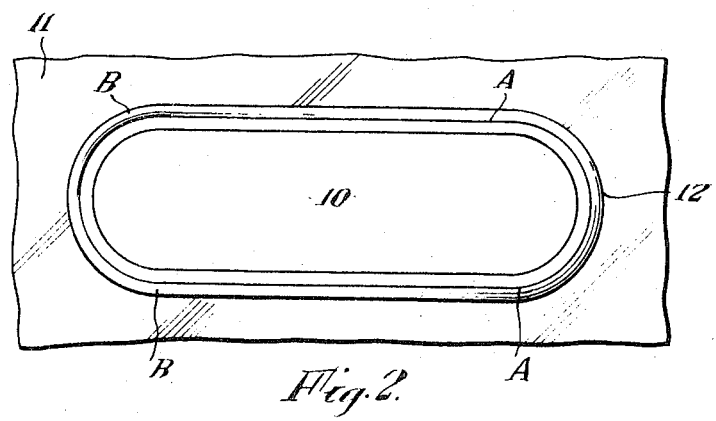
Figure 4:
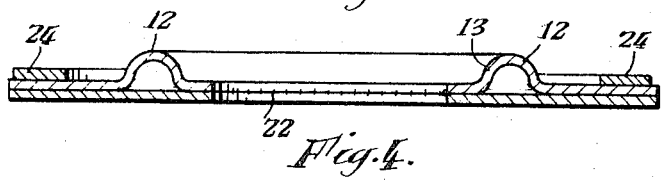
FIG. 4 is a section through one form of gasket according to the invention.

It will readily be appreciated that the securing of the second layer to the corrugated layer gives considerable resistance to the flattening of the corrugation, and this applies also where the corrugation has a non-circular shape, as illustrated for example in FIG. 2. If the washer is broadened from the shape shown in FIG. 3 to give a washer or gasket with a broader expanse of metal round the aperture, then it is not essential for the two layers of the gasket to be secured together at both the inner and outer peripheries. This is illustrated in FIG. 4, which shows a gasket according to the invention with the upper layer 13 welded or brazed to the lower part 15 only round the aperture 10 as shown at 22.

If further control is needed of the crushing force on the gasket, various methods may be employed, already known per se in relation to existing gaskets, such as:

1. Torque control on tightening the gasket between the surfaces to be sealed.
2. Support corrugations round the sealing zone.

3. Adjustment of the thickness or hardness of the gasket material and particularly the corrugated layer.

Alternatively or additionally I may provide a nip control spacer, either as a separate element or as an element welded or brazed to the rest of the gasket. Such a nip control ring is shown at 24 in FIG. 4.

When a gasket is being constructed which has to seal a number of apertures, for example, a cylinder head gasket of an automobile engine, it may be undesirable or impracticable to do a welding or brazing operation at each aperture. An alternative method of securing the second layer of the gasket to the first layer is a system of eyeletting, for example, by bending the material of the second layer round the periphery of the first layer at the apertures. This is illustrated in FIG. 5 where the second layer 15 has been formed with apertures smaller than those in the upper layer 13, and the edge 23,27 of the material forming the apertures has been stretched upwardly and outwardly round the periphery of the apertures 25 and 26 in the upper layer.

Figure 5:
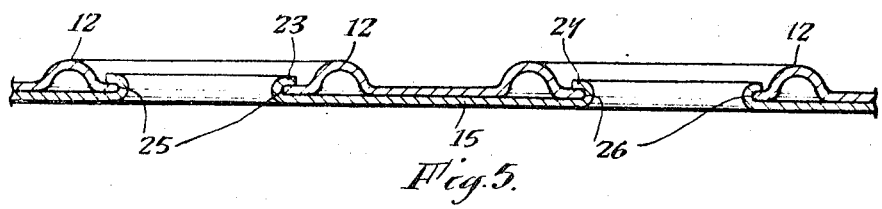
FIG. 5 is a section through another form of gasket according to the invention.

It can be seen that the eyeletting of FIG. 5 itself provides a measure of nip control, the thickness of the lower layer 15 being less than the height of the corrugations 12. If the torque applied on tightening the sealing surfaces on the gasket is such as to bring the sealing surfaces into contact with the edges 23,27 round the apertures, this has the effect of providing a sealing edge round the apertures as well as a very strong seal formed by the slight deformation of the corrugations 12.

The invention may be used with various forms of corrugation, whether V-shaped, arcuate, trapezoidal, or any other suitable section. The thickness, hardness and quality of the material of the washer or gasket will depend on the conditions in which it is to be used, e.g., the temperature, pressure, corrosion conditions and so on. In some cases it may be desirable to coat the metal washer or gasket with another metal by jacketing or plating, e.g., to provide a corrosion-resistant coating, or the washer or gasket may be lacquered or coated with rubber, polytetrafluoroethylene or asbestos.

What I claim and desire to protect by Letters Patent is:

1. Sealing means for location between a pair of opposed surfaces having at least one pair of aligned apertures, the means comprising two sheets of material which are in continuous close contact with one another except for an inverted channel section corrugation formed in one of said sheets around an aperture in both said sheets which is intended to align with said pair of aligned apertures, said two sheets being bonded together adjacent said inverted channel section in such a manner that flattening of the corrugations on application of compressive force thereto is resisted by virtue of the restraint imparted to the sheet having said corrugation by the other of said sheets through the bond therebetween.

2. Sealing means as claimed in claim 1 in which each layer defines a single aperture therethrough and in which the second layer is further secured to the first layer over a region remote from the aperture therethrough.

3. Sealing means as claimed in claim 2 in which a single upstanding corrugation is formed in the first layer to surround the aperture therethrough, the second layer being of annular form and secured to the first layer round both the inner and outer peripheries thereof.

4. Sealing means as claimed in claim 1 in which the two layers are secured together by welding.

5. Sealing means as claimed in claim 1 in which the two layers are secured together by brazing.

6. Sealing means as claimed in claim 1 and further comprising at least one nip control spacer adapted to seat on the outer regions of, to surround each aperture in, the first layer.

7. Sealing means as claimed in claim 6 in which the at least one nip control spacer is secured to the first layer.

8. Sealing means as claimed in claim 1 in which the layers are of metal, an outer protective coating being provided on said layers.

* * * * *